US009846689B2

(12) United States Patent
Perelman et al.

(10) Patent No.: US 9,846,689 B2
(45) Date of Patent: Dec. 19, 2017

(54) METHOD AND SYSTEM TO PROVIDE PORTABLE DATABASE FUNCTIONALITY IN AN ELECTRONIC FORM

(75) Inventors: Roberto Perelman, Sunnyvale, CA (US); David Stromfeld, San Jose, CA (US); Anatole A. Matveief, San Jose, CA (US); Tom Keller, Morgan Hill, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 348 days.

(21) Appl. No.: 12/022,019

(22) Filed: Jan. 29, 2008

(65) Prior Publication Data
US 2014/0032485 A1   Jan. 30, 2014

(51) Int. Cl.
*G06F 17/30* (2006.01)
*G06F 17/24* (2006.01)

(52) U.S. Cl.
CPC ................... *G06F 17/243* (2013.01)

(58) Field of Classification Search
CPC ......... G06F 17/30; G06F 17/243; G06F 3/048
See application file for complete search history.

(56) References Cited

U.S. PATENT DOCUMENTS

| | | | |
|---|---|---|---|
| 4,853,777 A | 8/1989 | Happ | |
| 6,088,700 A * | 7/2000 | Larsen et al. | |
| 6,100,990 A | 8/2000 | Ladewski | |
| 6,192,380 B1 * | 2/2001 | Light et al. | 715/207 |
| 6,199,079 B1 * | 3/2001 | Gupta et al. | 715/207 |
| 6,208,412 B1 | 3/2001 | Ladewski | |
| 6,376,829 B1 | 4/2002 | Okugawa | |
| 6,433,353 B2 | 8/2002 | Okugawa | |
| 6,490,601 B1 * | 12/2002 | Markus | G06F 17/243 705/80 |
| 6,589,290 B1 * | 7/2003 | Maxwell et al. | 715/224 |
| 6,910,179 B1 * | 6/2005 | Pennell et al. | 715/207 |
| 7,006,993 B1 * | 2/2006 | Cheong | G06Q 20/02 705/35 |
| 7,599,990 B1 * | 10/2009 | Groves et al. | 709/204 |
| 2002/0062342 A1 * | 5/2002 | Sidles | G06F 17/243 709/203 |
| 2002/0083068 A1 * | 6/2002 | Quass | G06F 17/243 |

(Continued)

FOREIGN PATENT DOCUMENTS

| | | | | |
|---|---|---|---|---|
| CA | 2382884 A1 * | 1/2002 | .......... | G06F 3/0481 |
| JP | 61223605 A | 10/1986 | | |

(Continued)

*Primary Examiner* — Augustine K Obisesan
(74) *Attorney, Agent, or Firm* — Shook Hardy & Bacon L.L.P.

(57) ABSTRACT

A method and system to provide portable database functionality in an electronic form is described. The system may include a communications module and a portability module. The communications module may be configured to receive a request to generate an electronic form, the electronic form to include preloaded database information. The portability module may be configured to respond to the request by configuring the electronic form to include the preloaded database information obtained from a source database. The preloaded database information may be used for a variety of purposes at fill time, when one or more electronic form field values are being filled in by a user.

20 Claims, 6 Drawing Sheets

(56) References Cited

U.S. PATENT DOCUMENTS

| | | | |
|---|---|---|---|
| 2002/0093530 A1* | 7/2002 | Krothapalli | G06F 17/243 715/745 |
| 2002/0165877 A1* | 11/2002 | Malcolm | G06Q 30/02 715/223 |
| 2003/0055723 A1* | 3/2003 | English | 705/14 |
| 2003/0084019 A1* | 5/2003 | Woodmansee | 707/1 |
| 2003/0105760 A1* | 6/2003 | Sini | G06F 17/243 |
| 2003/0140312 A1* | 7/2003 | Mohan et al. | 715/513 |
| 2003/0188262 A1* | 10/2003 | Maxwell et al. | 715/507 |
| 2004/0003353 A1* | 1/2004 | Rivera et al. | 715/507 |
| 2004/0030991 A1* | 2/2004 | Hepworth | G06F 17/243 715/226 |
| 2004/0181749 A1* | 9/2004 | Chellapilla et al. | 715/505 |
| 2004/0193455 A1* | 9/2004 | Kellington | 705/4 |
| 2004/0205357 A1* | 10/2004 | Kuo | G06F 21/6218 726/7 |
| 2004/0237030 A1* | 11/2004 | Malkin | G06F 17/243 715/222 |
| 2004/0239901 A1 | 12/2004 | Wasserman et al. | |
| 2005/0038868 A1* | 2/2005 | Spicer | 709/217 |
| 2005/0257148 A1* | 11/2005 | Goodman | G06F 17/243 715/226 |
| 2005/0289114 A1* | 12/2005 | Bellamy | 707/2 |
| 2006/0004927 A1* | 1/2006 | Rehman et al. | 709/250 |
| 2006/0050284 A1 | 3/2006 | Bertin-Mourot et al. | |
| 2006/0059434 A1* | 3/2006 | Boss et al. | 715/780 |
| 2006/0069981 A1* | 3/2006 | Enenkiel | G06F 17/2247 715/221 |
| 2006/0179404 A1* | 8/2006 | Yolleck | G06F 17/243 715/272 |
| 2006/0200754 A1* | 9/2006 | Kablesh et al. | 715/505 |
| 2006/0224948 A1* | 10/2006 | Desmond | G06F 17/243 715/207 |
| 2007/0089049 A1* | 4/2007 | Gormish | G06F 17/24 715/224 |
| 2007/0180380 A1* | 8/2007 | Khavari et al. | 715/704 |
| 2008/0091846 A1* | 4/2008 | Dang | G06F 17/243 709/246 |
| 2008/0177796 A1* | 7/2008 | Eldering | G06Q 10/109 |
| 2009/0006646 A1* | 1/2009 | Duarte | G06F 17/243 709/236 |

FOREIGN PATENT DOCUMENTS

| | | | |
|---|---|---|---|
| WO | WO99/34301 | 7/1999 | |
| WO | WO 0070838 A2 * | 11/2000 | G06F 17/30884 |

* cited by examiner

METHOD AND SYSTEM TO PROVIDE PORTABLE DATABASE FUNCTIONALITY IN AN ELECTRONIC FORM

TECHNICAL FIELD

This application relates to a method and system to provide portable database functionality in an electronic form.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Some existing products offer a comprehensive architecture for electronic document creation, collaboration, and process management. In the context of such architecture, a user may initiate a workflow by distributing an electronic form to a group of participants and then be able to collect the filled out forms from the participants. The participants, in turn, may fill out the form and submit the filled-out form to the initiator of the workflow. In order to access and fill out an electronic form, a participant may utilize an authoring application or a viewing application, such as Adobe® Reader® software.

Workflow participants who do not have direct access to a database and have intermittent Internet access, may have to resort to printing and mailing paper forms to the "home office," where the data provided by such participant must be re-keyed in order to be fed into a database.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
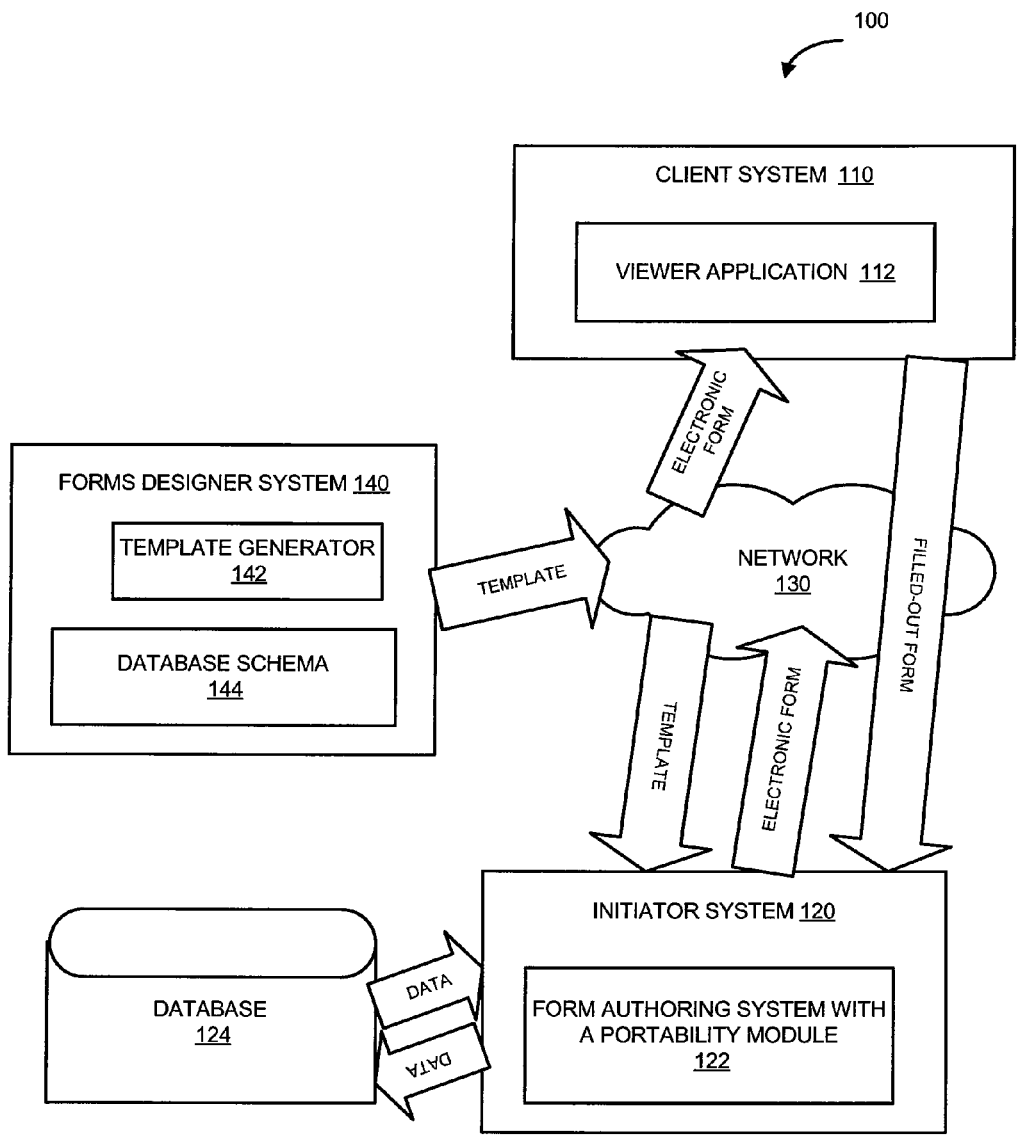
FIG. 1 shows a network environment within which an example system to provide portable database functionality in an electronic form may be implemented.

According to one example embodiment, an electronic form may be configured to interface with a database of a user in order to access data specific to that user (e.g., specific to a particular customer or company). An electronic form may be first created as a generic template, in a way to be suitable for users from various companies. A particular company may utilize an electronic form together with a database that stores company-specific data. The form may be configured to communicate with the database and obtain information to aid users in filling out the form. For example, sales representatives of the company may wish to be able to have a dropdown list that shows the names of potential customers, so that a customer's name does not need to be manually typed in. Another example of information that may be automatically obtained by the electronic form from a database is the names of various products. An electronic from may be configured to not only provide a drop-down list of selection choices to a user who is filling out the form, but also to automatically fill out additional data in the form (e.g., product price, product description, product serial number, etc.) based on the particular selection form the list by the user.

An electronic form may, in many cases, embody a complex "application packaged as a document" that may utilize a template-based grammar provided by the eXtensible Markup Language (XML) Forms Architecture (XFA), where the template associated with an electronic form defines presentation, calculations and interaction rules, while the content of the electronic form comprises the application data of the user. Though they are often packaged together, the template and the content of an electronic form may be separate entities. An electronic form may include static content and dynamic content. In one example embodiment, the static content is defined in the template and may include lines, rectangles and text, for example. The dynamic content, in one embodiment, may be content that is defined later, e.g., when the data is merged with the template or when the electronic form field values are filled in by an end-user.

In order to permit users that have to operate off-line to have the same experience that is provided to users that have network access to a database, an example electronic form may be configured to include so-called portable database functionality. The portable database functionality may be achieved by preparing a blank form by preloading it with database information. The preloaded database information in an electronic form may be used for a variety of purposes, e.g., during the creation of dynamic data. In some embodiments, the preloaded database information may be used as selection data for presenting to a user when the user is filling out the form. In other embodiments, the preloaded database information may be used for data-based validation or data-based "assisted filling" of the electronic form. An electronic form may include, for example, filtering code that allows some the data to be filtered so only part of it is presented when a drop down box is shown. Furthermore, more complex validation of dynamic data may be performed utilizing the preloaded database information. For example, the preloaded database information may be used in scenarios where certain customers are limited to certain items, or where certain states disallow certain items for sale, etc.

In one example embodiment, various elements of the electronic form template may have respective identification (ID) tags to associate a form element with certain data in a database. When a template (that appears to a user as a blank form) is opened with a viewer application (e.g., with Adobe® Acrobat® software) and the user requests to preload the form with information from an associated database, a process is triggered to query the database with ID tags to extract any matching entries from the database and store thus obtained data as the state data associated with the electronic form. The next time a user opens the form, the information from the database associated with ID tags may be viewed as selection data for filling out form fields. In one example embodiment, a form template may be created with Adobe® Designer® software. The preloading of the associated electronic form maybe accomplished utilizing a viewer application, such as Adobe® Acrobat® software. A form processing system that may be used to generate an electronic form with portable database capabilities may be implemented and utilized in the context of a network environment 100 illustrated in FIG. 1.

As shown in FIG. 1, the environment 100 includes a client system 110, an initiator system 120, and a forms designer system 140. The initiator system 120 may receive templates from the forms designer system 140 via a communications network 130. The communications network 130 may be a public network (e.g., the Internet, a wireless network, a public switched telephone network (PSTN), etc.) or a private network (e.g., LAN, WAN, Intranet, etc.). The initiator system 120 may include a form authoring system 122 configured to permit creating electronic forms with a portable database capability. In one example embodiment, the form authoring system 122 leverages the ability of the forms designer system 140 to create templates that already have been associated with a certain database structure. The forms designer system 140 may include a template generator 142 that utilizes a database schema 144, also provided with the forms designer system 140, to associate one or more form fields in a template with a database structure.

As shown in FIG. 1, the form authoring system 122 of the initiator system 120 may obtain data from a database 124 in order to pre-load an electronic form with selection data. It will be noted that the database 124 may reside locally with respect to the initiator system 120 or be in communication with the initiator system 120 via a communications link. A pre-loaded electronic form may be communicated to one or more client systems, such as the client system 110. The client system 110 may host a viewer application 112 to permit users to open and fill out electronic forms. The client system 110 may be connected to the network 130 intermittently. During the time when the client system 110 is not connected to the network 130, a user may utilize the viewer application 112 to open an electronic form configured by the form authoring system 122 with the portable database capability and still be able to select an item from a drop-down list to fill in a form field, as if the viewer application 112 is accessing the database 124 to obtain data. An example form authoring system may be described with reference to FIG. 2.

Figure 2:
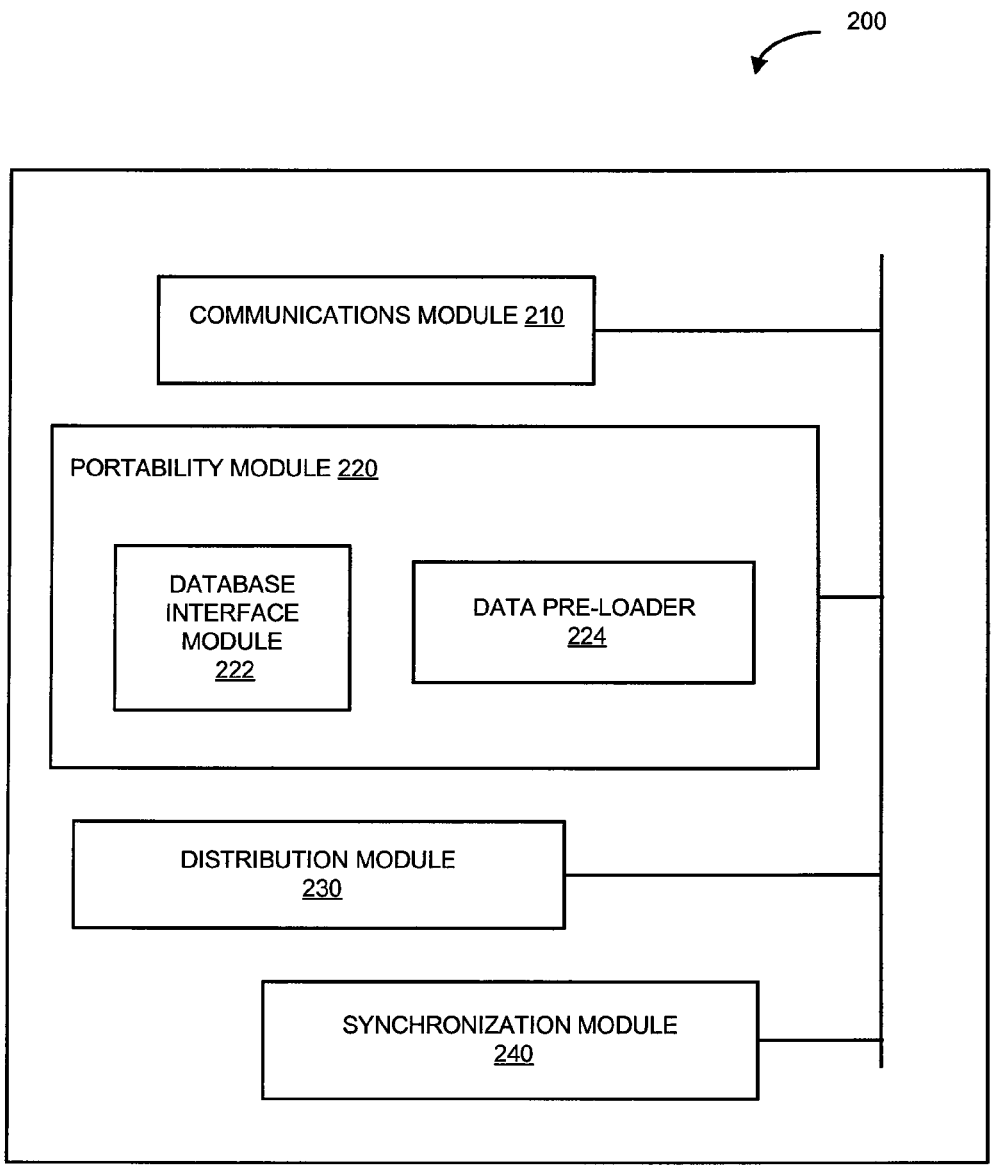
FIG. 2 is a block diagram illustrating a system, in accordance with an example embodiment, to configure an electronic form with portable database capability.

FIG. 2 is a block diagram illustrating a system 200, in accordance with an example embodiment, to configure an electronic form with portable database capability. The system 200, in one example embodiment, comprises a communications module 210, a portability module 220, a distribution module 230, and a synchronization module 240.

The communications module 210 may be configured to receive a request to generate an electronic form based on a source template. The communications module 210 may also be configured to receive the source template. The requested electronic form may be generated to have portable database functionality, utilizing the portability module 220. The portability module 220, in one example embodiment, includes a database interface module 222 and a data pre-loader 224. The database interface module 222 may be configured to obtain data from a source database, e.g., from the database 124 of FIG. 1. The data pre-loader 224 may be configured to pre-populate a control associated with a field of the electronic form with the data obtained from the source database. Example controls include drop down lists, text fields, etc. The data pre-loader 224, in one example embodiment, may also be configured to permit auto-completion of one or more further fields in the electronic form, based on the user's selection from the drop-down list.

The distribution module 230 may be configured to permit a user to initiate a form workflow, e.g., by automatically distributing an electronic form to participants. The synchronization module 240 may be used to collect the filled out forms from participants. Example operations performed by a form authoring application in general and by the system 200 in particular may be discussed with reference to FIG. 3.

Figure 3:
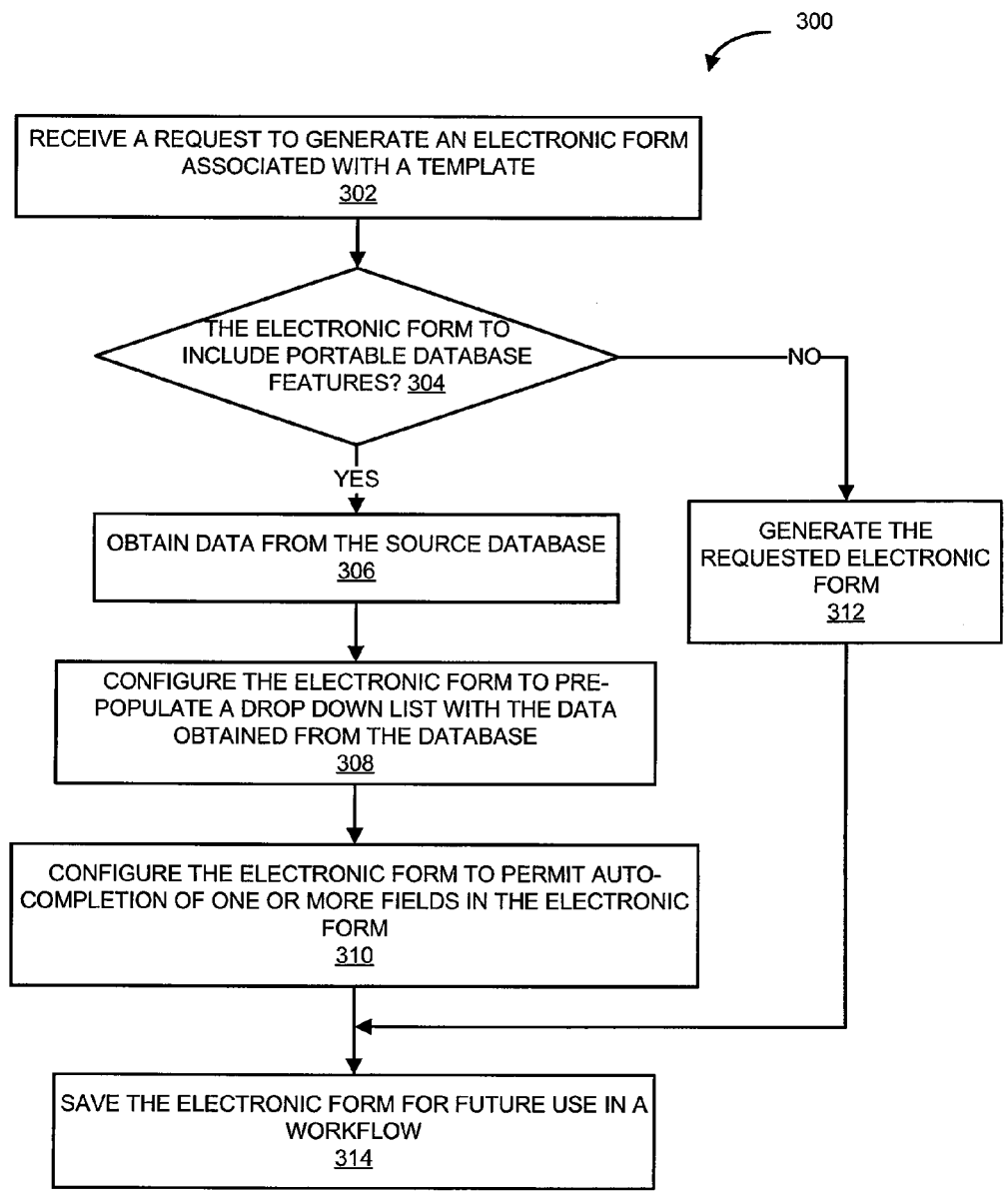
FIG. 3 is a flow chart illustrating a method to create an electronic form having portable database functionality, in accordance with an example embodiment.

FIG. 3 is a flow chart illustrating a method 300 to create an electronic form having portable database functionality, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2 described above.

As shown in FIG. 3, the method 300 commences at operation 302. At operation 302, the communications module 210 receives a request to generate an electronic form. If it is determined, at operation 304, that the requested electronic form is to have portable database functionality, the portability module 220 is engaged and the database interface module 222 is used to obtain data from a source database, e.g., from the database 124 of FIG. 1. At operation 308, the data pre-loader 224 configures the electronic form to pre-populate a drop-down list associated with a field of the electronic form with the data obtained from the source database. It will be noted, that a control that may be pre-populated with the data from the source database may be any control that may be used to provide a user with various selections for filling out a form field.

At operation 310, the data pre-loader 224 configures the electronic form to permit auto-completion of one or more fields in the electronic form based on the user's selection from the drop-down list. In some embodiments, an electronic form may be configured to permit a custom entry into a form field, even when the form field is associated with a drop-down list of valid selection choices.

If it is determined, at operation 304, that the requested electronic form is to not have portable database functionality, the method 300 proceeds to operation 312, where the requested form is generated. At operation 314, the resulting electronic form is saved, e.g., for future use in a workflow.

In one embodiment, a method of configuring an electronic form to have portable database capability may be associated with a configuration wizard, where a user is guided, e.g., via a series of presentation screens, to provide relevant input, such as to identify the source database, identify the participants in a workflow, etc. An example method of using an electronic form having portable database functionality may be described with reference to FIG. 4.

Figure 4:
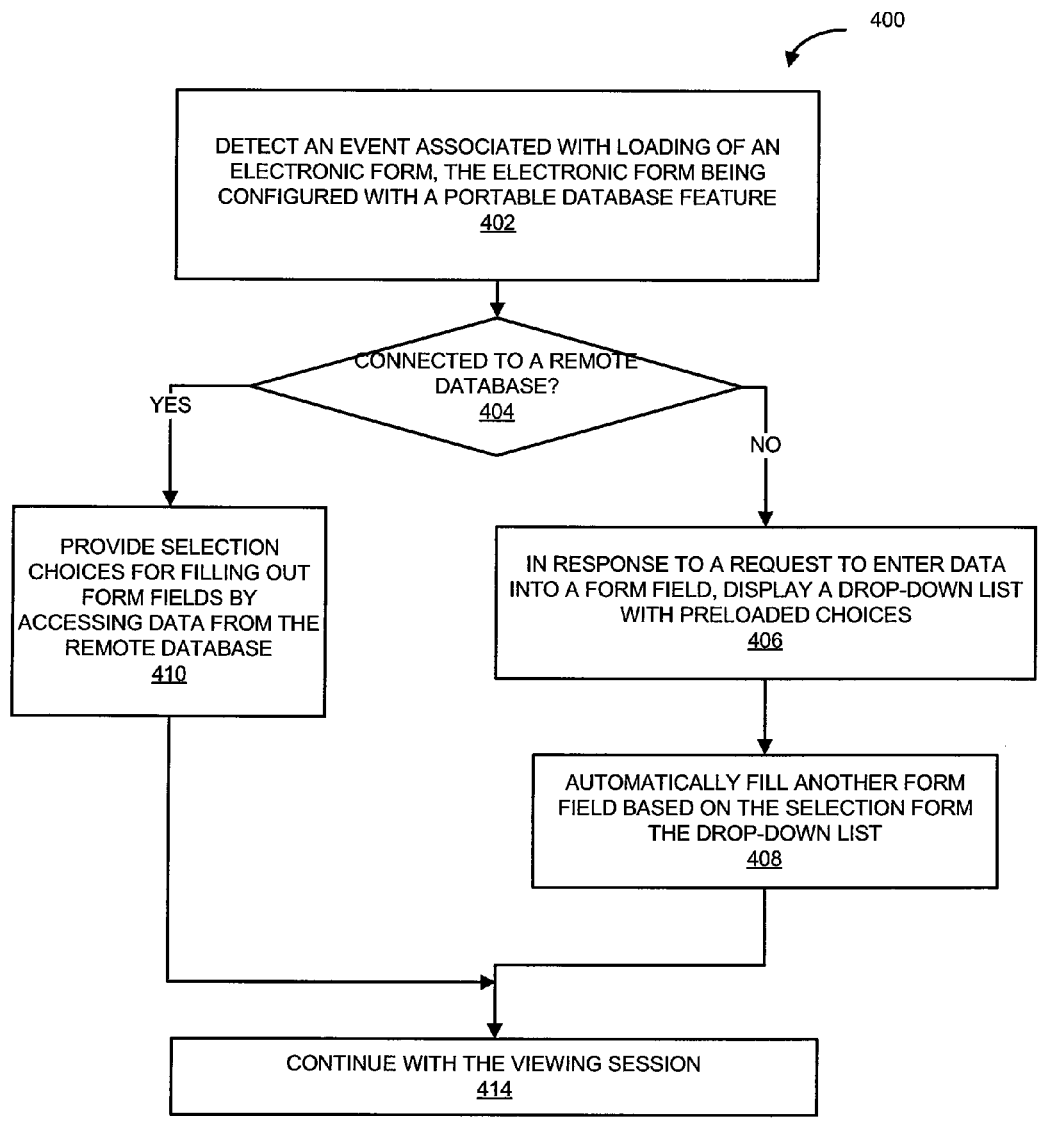
FIG. 4 is a flow chart illustrating a method, in accordance with an example embodiment, of using an electronic form having portable database functionality.

FIG. 4 is a flow chart illustrating an example method 400 of using an electronic form having portable database functionality. The method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in an electronic form itself.

As shown in FIG. 4, the method 400 commences at operation 402. At operation 402, an electronic form that has been prepared to include portable database functionality detects an event associated with loading of the electronic form. If it is determined, at operation 404, that the client system that hosts the viewer application is not connected to a remote database that stores data relevant to filling the data fields of the electronic form, the method 400 proceeds to operation 406. At operation 406, in response to a request associated with entering data into a form field, the electronic form displays a selection control (e.g., a drop-down list) with preloaded selection choices. At operation 408, after the user selects an entry from the drop-down list, one or more related form fields may be filled automatically, based on the selection. In one embodiment, the selection control may be implemented as a text field control, such that a user is permitted to enter custom information into the form field, in addition to being able to make a selection from the presented list of acceptable entries.

If it is determined, at operation 404, that the client system that hosts the viewer application is connected to a remote database that stores data relevant to filling out the electronic form, the method 400 proceeds to operation 410. At operation 410, any selection choices for filling out form fields are provided to the user by accessing the source database. The viewing session continues at operation 414. In some embodiments, the portable database functionality of the loaded electronic form is invoked regardless of whether the client system is connected to the remote database, such that operations 404 and 410 are not performed.

Figure 5:
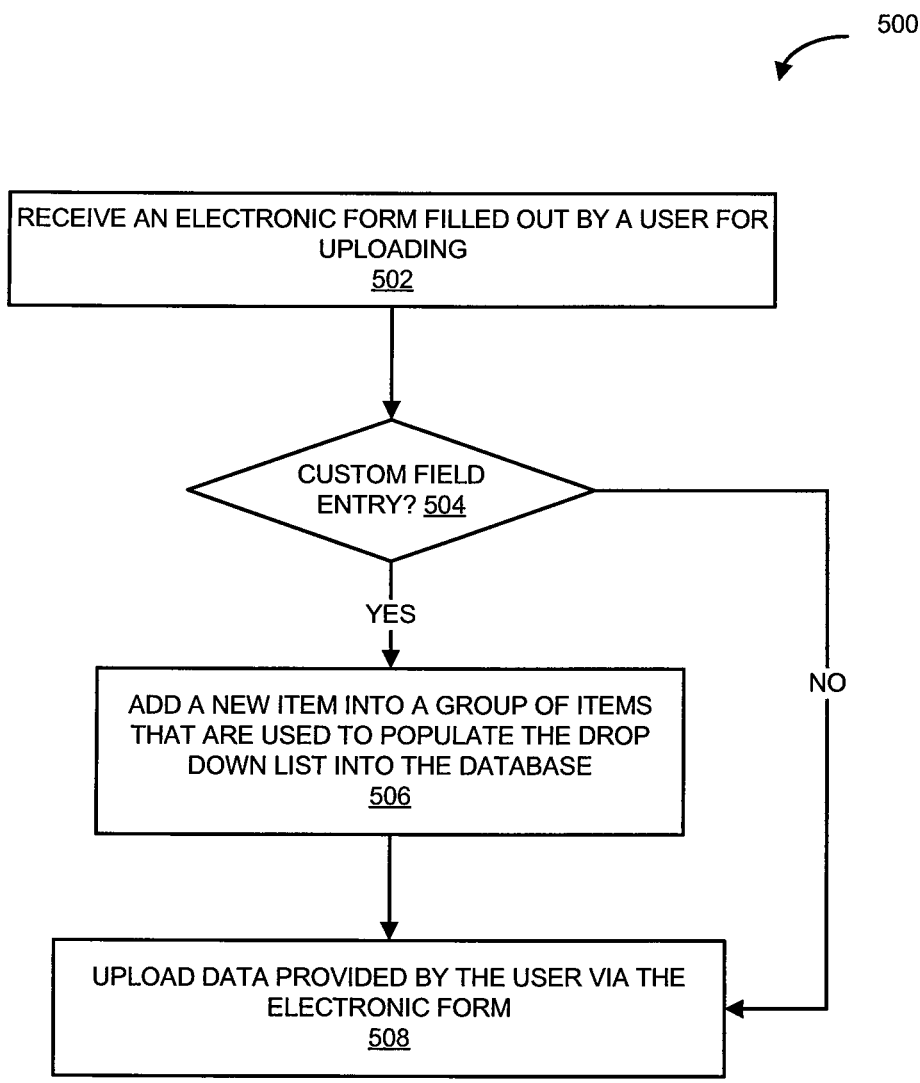
FIG. 5 is a flow chart illustrating a method, in accordance with an example embodiment, to upload data from an electronic form having portable database functionality.

As mentioned above, a user may be permitted to fill out an electronic form and submit the filled out form for collection by the workflow initiator. The user data from the filled out electronic form may then be synchronized with the source database. FIG. 5 is a flow chart illustrating a method 500, in accordance with an example embodiment, to upload data from an electronic form having portable database functionality.

The method 500 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules illustrated in FIG. 2.

As shown in FIG. 5, the method 500 commences at operation 502. At operation 502, the synchronization module 240 of FIG. 2 receives an electronic form that was filled out by a user. If it is determined, at operation 504, that the user data present in the electronic form includes a custom field entry (e.g., an entry that was not selected from an associated drop-down list or another control that provides selection capability), the custom field entry is extracted from the electronic form and added into an associated database at operation 506. The added entry may later be included into a group of items that are used to populate the associated selection control. At operation 508, the user data from the electronic form is uploaded to the database for further processing or storage.

It will be noted that, although some example embodiments of the invention may be implemented in the context of the XFA architecture and PDF, the techniques herein may be utilized advantageously with a variety of applications related to providing electronic forms to users.

Method and system to create an electronic form having portable database functionality may be implemented in a variety of ways, utilizing a variety of equipment components and programmatic techniques. In one example embodiment, a machine-readable medium may be provided having instruction data to cause a machine to receive a request to generate an electronic form, the electronic form to include portable database capability; and respond to the request by configuring the electronic form to include, into the electronic form, selection data obtained from a source database, the selection data comprising one or more choices for filling out an associated form field.

A further machine-readable medium may be provided having instruction data to cause a machine to receive an electronic form that includes user data, detect a custom field entry, and update a source database with the custom field entry.

Figure 6:
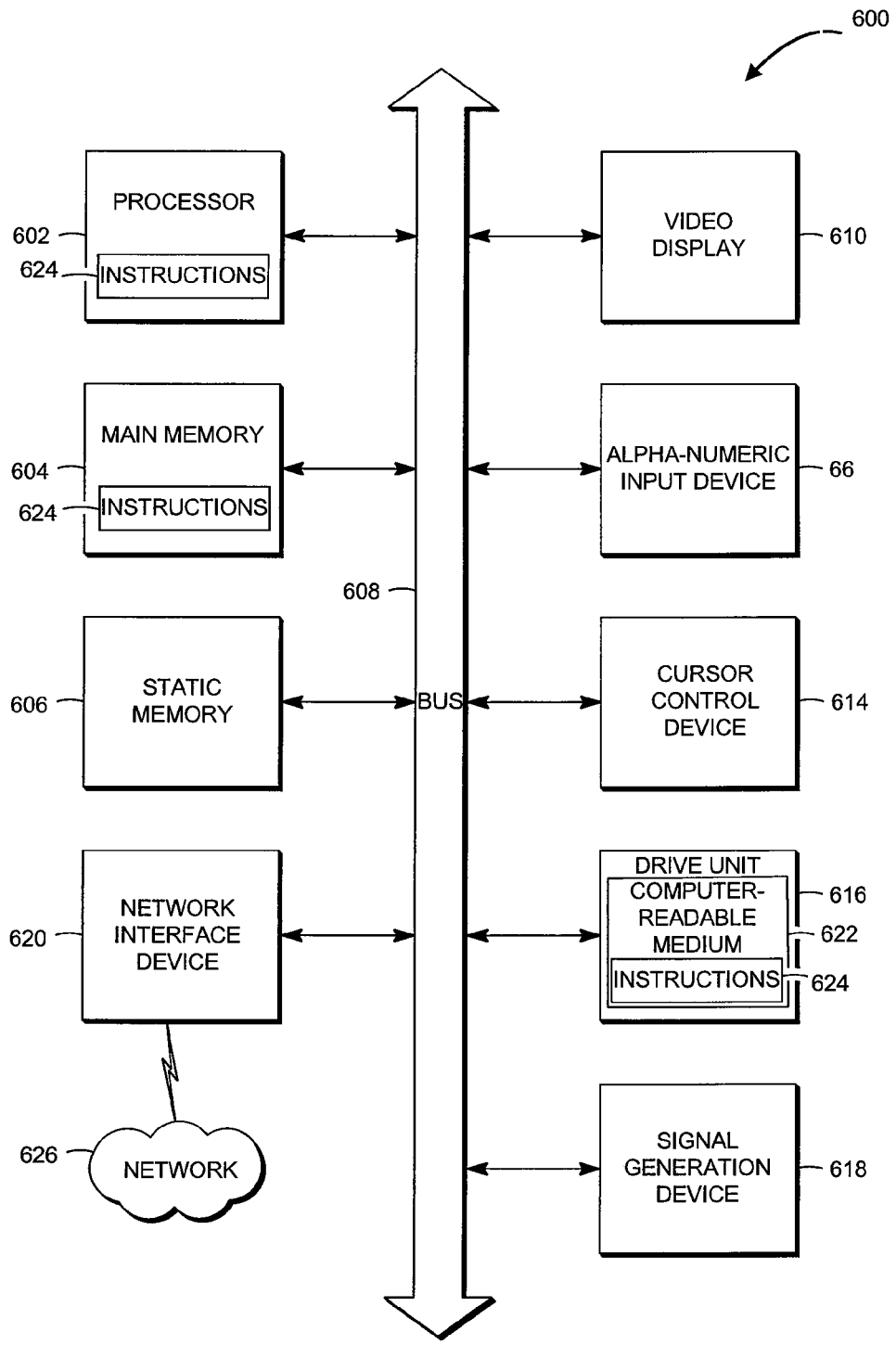
FIG. 6 illustrates a diagrammatic representation of a machine in the example form of a computer system within which a set of instructions, for causing the machine to perform any one or more of the methodologies discussed herein, may be executed.

FIG. 6 shows a diagrammatic representation of a machine in the example electronic form of a computer system 600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented system, comprising:
at least one processor and at least one machine-readable medium comprising instructions that configure the at least one processor to implement:
a communications module to receive a request to preload an electronic form with preloaded database information from a source database, the electronic form comprising a plurality of form fields;
a portability module to respond to the request by storing the preloaded database information comprising form field values and selection choices into the electronic form as state data, the storing pre-populating a selection control associated with a form field of the electronic form with the selection choices such that the selection choices are configured to be presented to a user in a viewer application when filling in the form field based on a client computer hosting the viewer application being unable to connect to a remote database, wherein the electronic form is embodied as an application packaged as a document that uses a template-based grammar defining presentation, calculations and interaction rules for filling out the electronic form, and wherein a template associated with the electronic form includes one or more identification (ID) tags, the one or more ID tags generated based on a database schema associated with the source database, and the storing of the preloaded database information uses the ID tags from the template to extract matching entries from the source database and store the matching entries as the state data in the document; and
a distribution module configured to:
transmit the document comprising the preloaded database information stored therein to the client computer; and
in response to receiving a request from the client computer that is based on detection of loading the transmitted electronic form in response to the user opening the transmitted document in the viewer application, transmit, from the remote database to the client computer, new selection choices and new form field values in association with the form field such that the selection choices and the form field values populating the selection control are automatically replaced with the new selection choices and new form field values for the filling in of the form field in the electronic form.

2. The system of claim 1, wherein the portability module comprises a database interface module to:
communicate with the source database;
receive database data; and
preload the received database data into the electronic form.

3. The system of claim 2, wherein the portability module comprises a data pre-loader to populate the selection control associated with the form field with the selection choices.

4. The system of claim 3, wherein the data pre-loader is to configure the electronic form to automatically populate the form field with a value that is selected by the user from the selection choices using the selection control.

5. The system of claim 1, wherein the selection control is a dropdown list.

6. The system of claim 1, wherein the distribution module is to distribute the document having the preloaded database information stored therein to a plurality of users.

7. The system of claim 1, comprising a synchronization module to:
obtain user data from a workflow participant the user data comprising selected form field values entered by the user into the plurality of form fields, the selected form field values including a value entered in the filling in of the form field; and
synchronize the selected form field values with the form field values in the source database.

8. The system of claim 7, wherein the synchronization module is further to:
detect a custom form field value in the user data based on the custom form field value being distinct from every one of the form field values in the preloaded database information; and
update the source database with the custom form field value in response to the detecting.

9. The system of claim 1, wherein the template defines static content of the electronic form.

10. The system of claim 1, wherein the electronic form is in a Portable Document Format (PDF) and the preloaded database information is stored within the PDF.

11. A computer-implemented method comprising:
receiving a request to preload an electronic form with preloaded database information from a source database, the electronic form comprising a plurality of form fields;
responding to the request by storing the preloaded database information comprising form field values and selection choices into the electronic form as state data, the storing pre-populating a selection control associated with a form field of the electronic form with the selection choices such that the selection choices are configured to be presented to a user in a viewer application when filling in the form field based on a client computer hosting the viewer application being unable to connect to a remote database, wherein the electronic form is embodied as an application packaged as a document that uses a template-based grammar defining presentation, calculations and interaction rules for filling out the electronic form, and wherein a template associated with the electronic form includes one or more identification (ID) tags, the one or more ID tags generated based on a database schema associated with the source database, and the storing of the preloaded database information uses the ID tags from the template to extract matching entries from the source database and store the matching entries as the state data in the document;

transmitting the document comprising the preloaded database information stored therein to the client computer; and in response to receiving a request from the client computer that is based on detection of loading the transmitted electronic form in response to the user opening the transmitted document in the viewer application, transmitting, from the remote database to the client computer, new selection choices and new form field values in association with the form field such that the selection choices and the form field values populating the selection control are automatically replaced with the new selection choices and new form field values for the filing in of the form field in the electronic form.

12. The method of claim 11, comprising:
receiving database data; and
preloading the received database data into the electronic form.

13. The method of claim 11, wherein the electronic form is in a Portable Document Format (PDF) and the preloaded database information is stored within the PDF.

14. The method of claim 11, wherein the selection control is a dropdown list and each selection choice of the selection choices is a respective selectable entry in the dropdown list.

15. The method of claim 11, comprising:
in response to detecting loading of the received electronic form in the viewer application, determining the client computer hosting the viewer application is not connected to the remote database; and
in response to the determining the client computer hosting the viewer application is not connected to the remote database, using the selection control comprising the pre-populated selection control with the selection choices for the filling in of the form field in the viewer application.

16. The method of claim 11, comprising:
in response to detecting the loading of the received electronic form in the viewer application, determining the client computer hosting the viewer application is connected to the remote database and determining the remote database stores data relevant to filling out the electronic form, wherein the loading is in response to the user opening the received electronic form in the viewer application;
in response to the determining the client computer is connected to the remote database and the determining the remote database stores data relevant to the filing out of the electronic form, automatically issuing the request:
receiving from the remote database the new selection choices and the new form field values in association with the form field; and
replacing the selection choices and the form field values populating the control with the new selection choices and new form field values for the filing in of the form field.

17. The method of claim 11, comprising:
obtaining user data from a workflow participant the user data comprising selected form field values entered by the user into the plurality of form fields, the selected form field values including a value entered in the filling in of the form field; and
synchronizing the selected form field values with the form field values in the source database.

18. The method of claim 17, comprising:
detecting a custom form field value in the user data based on the custom form field value being distinct from every one of the form field values in the preloaded database information; and
updating the source database with the custom form field value in response to the detecting.

19. The method of claim 11, wherein the template defines static content of the electronic form.

20. A non-transitory machine-readable medium having instruction data to cause a machine to perform a method comprising:
receiving at a client computer, one or more network communications comprising an electronic form embodied as an application packaged as a document that uses a template-based grammar defining presentation, calculations and interaction rules for filling out the electronic form the electronic form having contained therein as state data a plurality of form fields, form field values, selection choices, and a selection control associated with a form field, wherein the selection control is pre-populated with the selection choices such that the selection choices are configured to be presented to a user in a viewer application when filling in the form field based on the client computer hosting the viewer application being unable to connect to a remote database, each of the selection choices corresponding to at least one of the form field values and being selectable by the user to enter the at least one of the form field values into the form field during the filling in of the form field, and wherein a template associated with the electronic form includes one or more identification (ID) tags, the one or more ID tags generated based on a database schema associated with a source database used to preload the electronic form with preloaded database information from the source database using the ID tags from the template to extract matching entries from the source database and store the matching entries as the state data in the document;

in response to detecting loading of the received electronic form in the viewer application, determining the client computer hosting the viewer application is connected to the remote database and determining the remote database stores data relevant to filling out the electronic form, wherein the loading is in response to the user opening the received electronic form in the viewer application;

in response to the determining the client computer is connected to the remote database and the determining the remote database stores data relevant to the filing out of the electronic form, automatically:
receiving from the remote database new selection choices and new form field values in association with the form field; and
replacing the selection choices and the form field values populating the control with the new selection choices and new form field values for the filing in of the form field.

* * * * *